United States Patent
Kamran et al.

(10) Patent No.: US 10,831,684 B1
(45) Date of Patent: Nov. 10, 2020

(54) KERNAL DRIVER EXTENSION SYSTEM AND METHOD

(71) Applicant: EMC IP Holding Company, LLC, Hopkinton, MA (US)

(72) Inventors: Lior Kamran, Rishon LeZion (IL); Amitai Alkalay, Kadima (IL); Eldad Zinger, Raanana (IL); Alexander Barabash, Rehovot (IL); Leonid Ravich, Raanana (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 16/527,263

(22) Filed: Jul. 31, 2019

(51) Int. Cl.
*G06F 3/00* (2006.01)
*G06F 13/16* (2006.01)
*G06F 8/60* (2018.01)
*G06F 12/10* (2016.01)
*G06F 13/10* (2006.01)

(52) U.S. Cl.
CPC .......... *G06F 13/1673* (2013.01); *G06F 8/60* (2013.01); *G06F 12/10* (2013.01); *G06F 13/102* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 2014/0115089 A1* | 4/2014 | Maybee | G06F 16/24544 709/213 |
| 2017/0123971 A1* | 5/2017 | Kanaujia | G06F 12/10 |
| 2017/0308298 A1* | 10/2017 | Vyshetsky | G06F 3/0679 |
| 2019/0196955 A1* | 6/2019 | Chang | G06F 12/0246 |

* cited by examiner

*Primary Examiner* — Henry Tsai
*Assistant Examiner* — Dean Phan
(74) *Attorney, Agent, or Firm* — Brian J. Colandreo; Mark H. Whittenberger; Holland & Knight LLP (57) ABSTRACT

A method, computer program product, and computing system for deploying a kernel driver extension in a kernel of a storage processor communicatively coupled to one or more non-volatile memory express (NVMe) devices. The kernel driver extension may be communicatively coupled with a standard NVMe kernel driver deployed in the kernel of the storage processor. One or more input/output (I/O) operations may be performed on the one or more NVMe devices via the standard NVMe kernel driver and the kernel driver extension.

17 Claims, 7 Drawing Sheets

KERNAL DRIVER EXTENSION SYSTEM AND METHOD

BACKGROUND

Storing and safeguarding electronic content may be beneficial in modern business and elsewhere. Accordingly, various methodologies may be employed to communicate data to and from storage arrays more efficiently.

Most conventional storage systems utilize standard drivers to communicate data from one or more user applications to storage devices of a storage array. However most of these standard drivers (e.g., standard kernel drivers) include inefficiencies in the number of central processing unit (CPU) cycles required to process data. Conventional approaches to overcome these inefficiencies in standard drivers expose storage devices directly to issues in a user application and/or require modifications to user applications.

SUMMARY OF DISCLOSURE

In one example implementation, a computer-implemented method executed on a computing device may include but is not limited to deploying a kernel driver extension in a kernel of a storage processor communicatively coupled to one or more non-volatile memory express (NVMe) devices. The kernel driver extension may be communicatively coupled with a standard NVMe kernel driver deployed in the kernel of the storage processor. One or more input/output (I/O) operations may be performed on the one or more NVMe devices via the standard NVMe kernel driver and the kernel driver extension.

One or more of the following example features may be included. One or more buffers of one or more processes may be registered, via the kernel driver extension, once. One or more virtual addresses corresponding to one or more physical addresses associated with the one or more registered buffers of the one or more processes may be mapped, via the kernel driver extension, once. Performing the one or more I/O operations on the storage array via the standard NVMe kernel driver and the kernel driver extension may include one or more of providing, via the kernel driver extension, the one or more I/O operations from one or more processes to a I/O submission queue of the standard NVMe kernel driver; and providing, via the kernel driver extension, one or more I/O completions associated with the one or more I/O operations from an I/O completion queue of the standard NVMe kernel driver to the one or more processes. One or more I/O queue creation commands may be received, at the kernel driver extension, from one or more processes. One or more I/O submission queues and one or more I/O completion queues may be created, in the kernel driver extension, in response to the one or more I/O queue creation commands from the one or more processes. The one or more I/O submission queues and the one or more I/O completion queues may be allocated, via the kernel driver extension, per process. Performing the one or more I/O operations on the storage array via the standard NVMe kernel driver and the kernel driver extension may include performing, via the standard NVMe kernel driver, one or more management operations on the one or more NVMe devices. The one or more I/O queues of the kernel may be isolated from one or more processes via the kernel driver extension.

In another example implementation, a computer program product resides on a computer readable medium that has a plurality of instructions stored on it. When executed by a processor, the instructions cause the processor to perform operations that may include but are not limited to deploying a kernel driver extension in a kernel of a storage processor communicatively coupled to one or more non-volatile memory express (NVMe) devices. The kernel driver extension may be communicatively coupled with a standard NVMe kernel driver deployed in the kernel of the storage processor. One or more input/output (I/O) operations may be performed on the one or more NVMe devices via the standard NVMe kernel driver and the kernel driver extension.

One or more of the following example features may be included. One or more buffers of one or more processes may be registered, via the kernel driver extension, once. One or more virtual addresses corresponding to one or more physical addresses associated with the one or more registered buffers of the one or more processes may be mapped, via the kernel driver extension, once. Performing the one or more I/O operations on the storage array via the standard NVMe kernel driver and the kernel driver extension may include one or more of providing, via the kernel driver extension, the one or more I/O operations from one or more processes to a I/O submission queue of the standard NVMe kernel driver; and providing, via the kernel driver extension, one or more I/O completions associated with the one or more I/O operations from an I/O completion queue of the standard NVMe kernel driver to the one or more processes. One or more I/O queue creation commands may be received, at the kernel driver extension, from one or more processes. One or more I/O submission queues and one or more I/O completion queues may be created, in the kernel driver extension, in response to the one or more I/O queue creation commands from the one or more processes. The one or more I/O submission queues and the one or more I/O completion queues may be allocated, via the kernel driver extension, per process. Performing the one or more I/O operations on the storage array via the standard NVMe kernel driver and the kernel driver extension may include performing, via the standard NVMe kernel driver, one or more management operations on the one or more NVMe devices. The one or more I/O queues of the kernel may be isolated from one or more processes via the kernel driver extension.

In another example implementation, a computing system includes at least one processor and at least one memory architecture coupled with the at least one processor, wherein the computing system is configured to perform operations that may include but are not limited to deploying a kernel driver extension in a kernel of a storage processor communicatively coupled to one or more non-volatile memory express (NVMe) devices. The kernel driver extension may be communicatively coupled with a standard NVMe kernel driver deployed in the kernel of the storage processor. One or more input/output (I/O) operations may be performed on the one or more NVMe devices via the standard NVMe kernel driver and the kernel driver extension.

One or more of the following example features may be included. One or more buffers of one or more processes may be registered, via the kernel driver extension, once. One or more virtual addresses corresponding to one or more physical addresses associated with the one or more registered buffers of the one or more processes may be mapped, via the kernel driver extension, once. Performing the one or more I/O operations on the storage array via the standard NVMe kernel driver and the kernel driver extension may include one or more of providing, via the kernel driver extension, the one or more I/O operations from one or more processes to a I/O submission queue of the standard NVMe kernel driver; and providing, via the kernel driver extension, one or more I/O completions associated with the one or more I/O operations from an I/O completion queue of the standard NVMe kernel driver to the one or more processes. One or more I/O queue creation commands may be received, at the kernel driver extension, from one or more processes. One or more I/O submission queues and one or more I/O completion queues may be created, in the kernel driver extension, in response to the one or more I/O queue creation commands from the one or more processes. The one or more I/O submission queues and the one or more I/O completion queues may be allocated, via the kernel driver extension, per process. Performing the one or more I/O operations on the storage array via the standard NVMe kernel driver and the kernel driver extension may include performing, via the standard NVMe kernel driver, one or more management operations on the one or more NVMe devices. The one or more I/O queues of the kernel may be isolated from one or more processes via the kernel driver extension.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
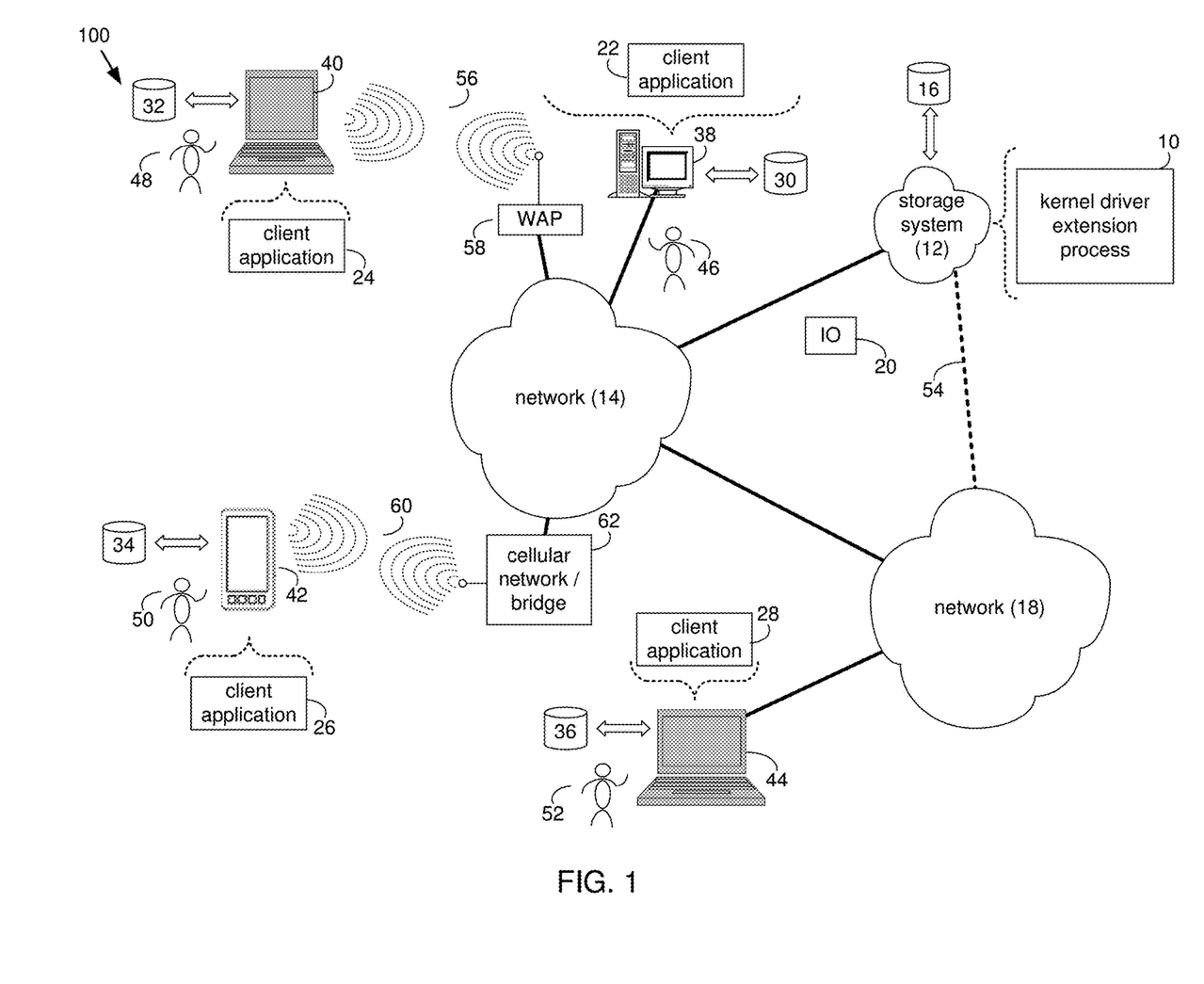
FIG. 1 is an example diagrammatic view of a storage system and a kernel driver extension process coupled to a distributed computing network according to one or more example implementations of the disclosure.

System Overview:

Referring to FIG. 1, there is shown kernel driver extension process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of kernel driver extension process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of kernel driver extension process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a process, such as kernel driver extension process 10 of FIG. 1, may include but is not limited to, deploying a kernel driver extension in a kernel of a storage processor communicatively coupled to one or more nonvolatile memory express (NVMe) devices. The kernel driver extension may be communicatively coupled with a standard NVMe kernel driver deployed in the kernel of the storage processor. One or more input/output (I/O) operations may be performed on the one or more NVMe devices via the standard NVMe kernel driver and the kernel driver extension.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
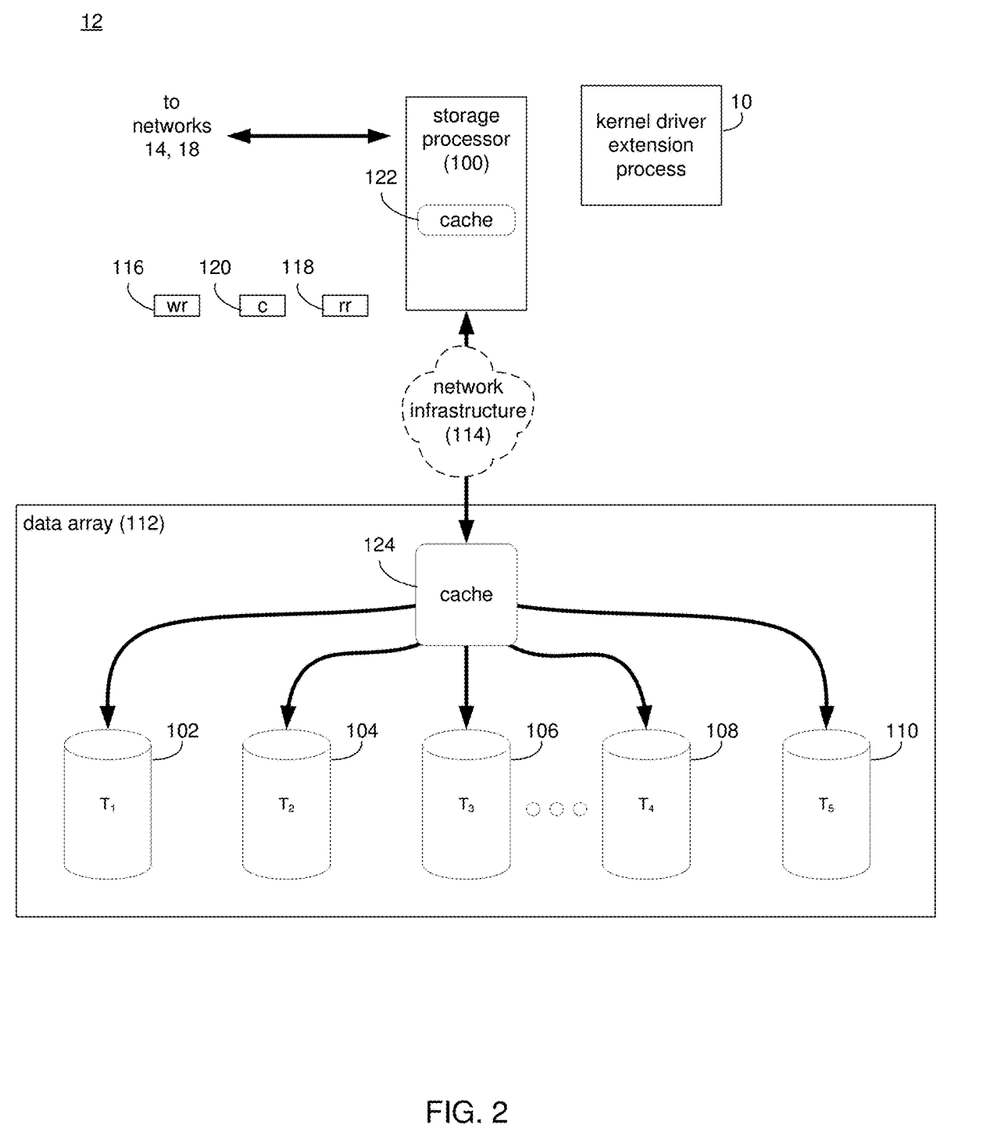
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniB and network, or any other circuit switched/packet switched network.

Storage system 12 may execute all or a portion of kernel driver extension process 10. The instruction sets and subroutines of kernel driver extension process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of kernel driver extension process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of kernel driver extension process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of kernel driver extension process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Storage System Memory Architecture:

In the context of storage systems, a storage processor (e.g., storage processor 100) may include one or more central processing units (CPUs) with one or more cores, a cache memory system (e.g., cache memory system 122), and one or more network interface cards (NICs). As discussed above and in some embodiments, the storage processor (e.g., storage processor 100) may be communicatively coupled with a storage array or data array (e.g., data array 112). In some embodiments, the data array (e.g., data array 112) may include one or more storage devices. In some embodiments, the data array may be a non-volatile memory disk array with one or more solid-state drives (SSDs). The storage processor 100 may interact with the one or more SSDs via the non-volatile memory express (NVMe) protocol or standard. In this manner, storage devices, such as SSDs, that are configured to communicate with a storage processor via the NVMe protocol may generally be referred to as NVMe devices.

As is known in the art, NVMe may generally include a host controller interface and storage protocol configured to transfer data between client systems and SSDs over a Peripheral Component Interconnect Express (PCIe) bus. Referring also to the example of FIG. 3 and in some embodiments, the storage system memory architecture (e.g., within the memory system 122 of storage processor 100) may be represented a user space layer (e.g., user space layer 300) and a kernel layer (e.g., kernel layer 302). A user space layer (e.g., user space layer 300) may generally include a set of memory locations in which one or more processes (e.g., processes 304, 306, 308) are executed. A process (e.g., processes 304, 306, 308) may generally include an executing instance of a program or application. For example and in some embodiments, one or more client electronic devices (e.g., client electronic devices 38, 40, 42, 44) may execute one or more programs or applications (e.g., processes 304, 306, 308) with data stored in a storage system (e.g., storage system 12) via a storage processor (e.g., storage processor 100). In some embodiments, processes 304, 306, 308 may store user data (e.g., from client electronic devices 38, 40, 42, 44) and its metadata on a data array (e.g., data array 112) of storage system 12. As discussed above, the data array may include one or more NVMe devices (e.g., storage targets 102, 104, 106, 108, 110).

Figure 3:
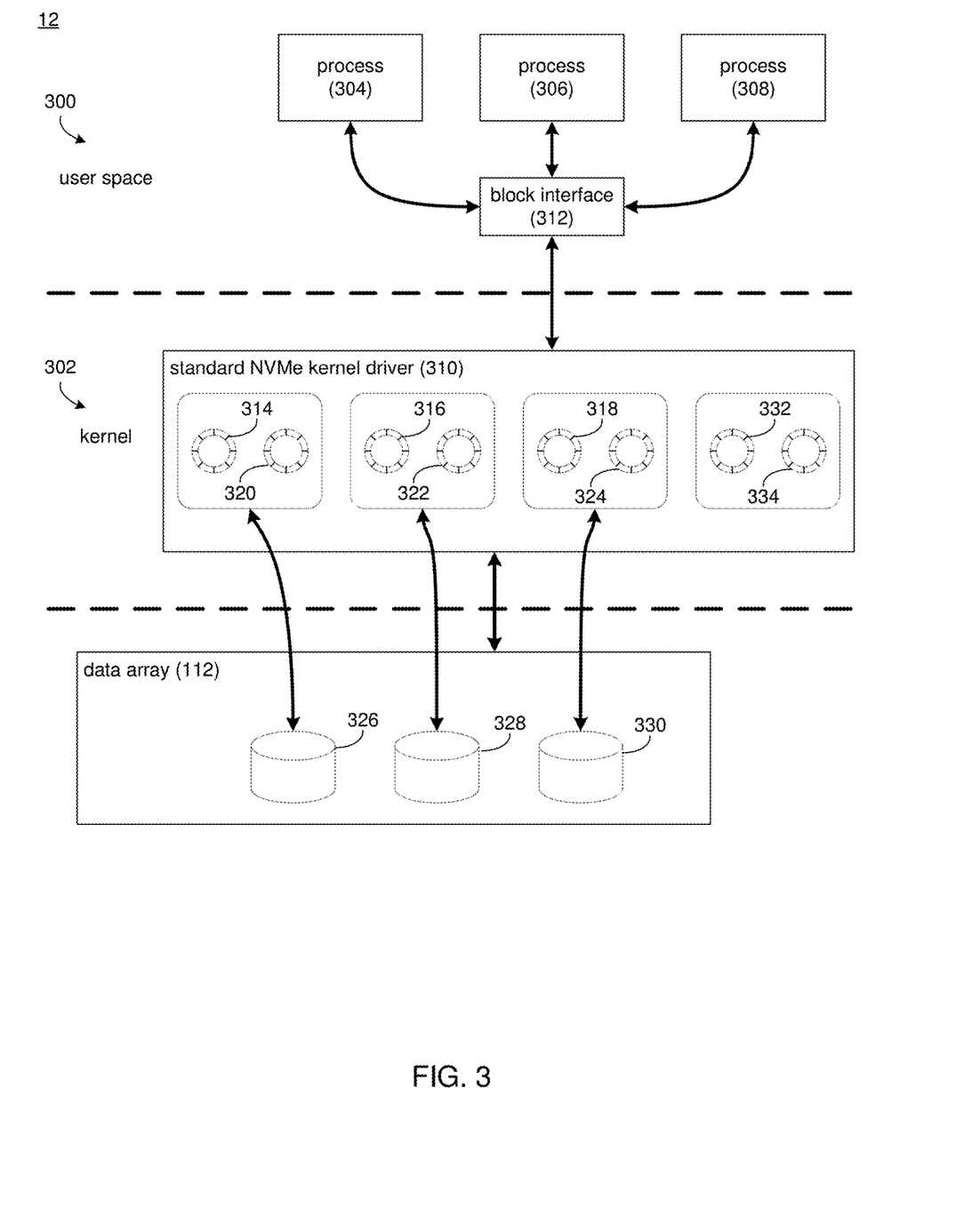
FIG. 3 is an example diagrammatic view of the kernel driver extension process of FIG. 1 according to one or more example implementations of the disclosure.

In some embodiments, the kernel (e.g., kernel 302) may generally include the set of memory locations where the kernel of an operating system (OS) executes or runs and/or where one or more device drivers may execute. As is known in the art, the kernel may manage individual processes within the user space to prevent them from interfering with one another as they communicate data to and from the data array (e.g., data array 112). In some embodiments, kernel 302 may be accessed by processes 304, 306, 308 within user space 300 by the use of system calls. Examples of system calls may include I/O requests or operations configured to transfer data between a CPU and a peripheral device (e.g., one or more NVMe devices). However, it will be appreciated that other system calls are possible within the scope of the present disclosure.

In some embodiments, kernel 302 may include a standard NVMe kernel driver (e.g., a standard NVMe kernel driver 310) deployed in kernel 302 for communicating data between processes 304, 306, 308 of user space 300 and one or more NVMe devices (e.g., storage targets 102, 104, 106, 108, 110). In some embodiments, the standard NVMe kernel driver (e.g., standard NVMe kernel driver 310) may be a standard Linux® NVMe kernel driver generally available in most storage processors. As is known in the art, processes 304, 306, 308 may communicate with standard NVMe kernel driver 310 via a block interface (e.g., block interface 312).

In some embodiments, standard NVMe kernel driver 310 may include one or more I/O submission queues (e.g., I/O submission queues 314, 316, 318) and one or more I/O completion queues (e.g., I/O completion queues 320, 322, 324). In some embodiments, I/O submission queues 314, 316, 318 and I/O completion queues 320, 322, 324 may be organized in pairs (e.g., I/O submission queue 314 paired with I/O completion queue 320). I/O submission queue 314 may generally send one or more I/O requests (e.g., I/O request 20) to the one or more NVMe devices (e.g., storage targets 326, 328, 330) and I/O completion queue 320 may generally receive a completion for a corresponding I/O request of I/O submission queue 314. In some embodiments, the one or more I/O submission queues and the one or more completion queues may be organized per core of a multi-core CPU, per NVMe device, and/or per core and per NVMe device (e.g., one or more I/O submission queues and one or more I/O completion queues for each core and NVMe device). In the example of FIG. 3, suppose for example purposes only that the CPU of storage processor 100 is a single core CPU. In this example, a pair of I/O submission queues and I/O completion queues may be created by standard NVMe kernel driver 310 for each NVMe device (e.g., NVMe devices 326, 328, 330) of a data array (e.g., data array 112). However, it will be appreciated that any number of CPU cores and/or NVMe devices may be used within the scope of the present disclosure.

In some embodiments, standard NVMe kernel driver 310 may include one or more administrative I/O submission queues (e.g., I/O submission queue 332) and one or more administrative I/O completion queues (e.g., I/O completion queue 334) which may or may not be organized in pairs. Administrative I/O submission queue 332 may be configured to provide one or more management operations (e.g., create and/or destroy I/O submission queues, create and/or destroy I/O completion queues, etc.) and administrative I/O completion queue 334 may be configured to receive completions for a corresponding I/O request of administrative I/O submission queue 332.

In some embodiments, the standard NVMe kernel driver (e.g., standard NVMe kernel driver 310) may be configured to provide a command to a plurality of doorbell registers associated with the one or more NVMe devices. A doorbell register may generally include a register configured to indicate that an I/O request is ready for processing by the one or more NVMe devices and/or has been processed by the one or more NVMe devices and are logically located on each NVMe device. In some embodiments, the plurality of doorbell registers may be provided by the NVMe device as part of its PCIe memory-mapped IO. There may generally be two kinds of doorbell registers: I/O submission queue registers and I/O completion queue registers. As will be discussed in greater detail below, the standard NVMe kernel driver (or the kernel driver extension of the present disclosure) may update the doorbell register to indicate its progress in filling up an I/O submission queue or consuming the I/O completion queue. For example, the one or more NVMe devices may include a plurality of doorbell registers with at least one doorbell register configured to indicate that an I/O request has been provided to I/O submission queue 312 and at least one doorbell register configured to indicate that an I/O completion has been processed (e.g., by a process in the user space).

However, and as will be discussed in greater detail below, standard NVMe kernel driver 310 may generally be inefficient and require substantial CPU cycles when processing I/O operations. As a result, fewer CPU cycles may be available for other components of storage system 12 and may decrease system performance.

While conventional approaches to address this limitation have included implementing standard NVMe kernel driver 310 in user space 300 and/or disconnecting standard NVMe kernel driver 310, these approaches create other significant challenges. For example, by implementing standard NVMe kernel driver 310 in user space 300, memory of the one or more I/O submission queues and the one or more I/O completion queues may be exposed to the user space and vulnerable to memory overrun. This may cause I/Os to be written to random physical addresses within the one or more NVMe devices and cause data inconsistency. Additionally, approaches involving the disconnect of standard NVMe kernel driver 310 may force significant modifications to processes (e.g., processes 304, 306, 308) when desiring to access the one or more NVMe devices (e.g., NVMe devices 326, 328, 330) of data array 112.

Embodiments of the present disclosure may provide a kernel driver extension in a kernel to co-exist with the standard NVMe kernel driver. As will be discussed in greater detail below, the kernel driver extension of the present disclosure may provide higher data transfer performance between one or more processes and one or more NVMe devices with less CPU consumption than the standard NVMe kernel driver without exposing the memory of the one or more I/O submission queues and the one or more I/O completion queues to the user space and/or without modifying the one or more processes of the user space. For example, the kernel driver extension of the present disclosure may provide more I/O operations to a number of NVMe devices per CPU cycle, while leaving other aspects of the standard NVMe kernel intact.

Figure 4:
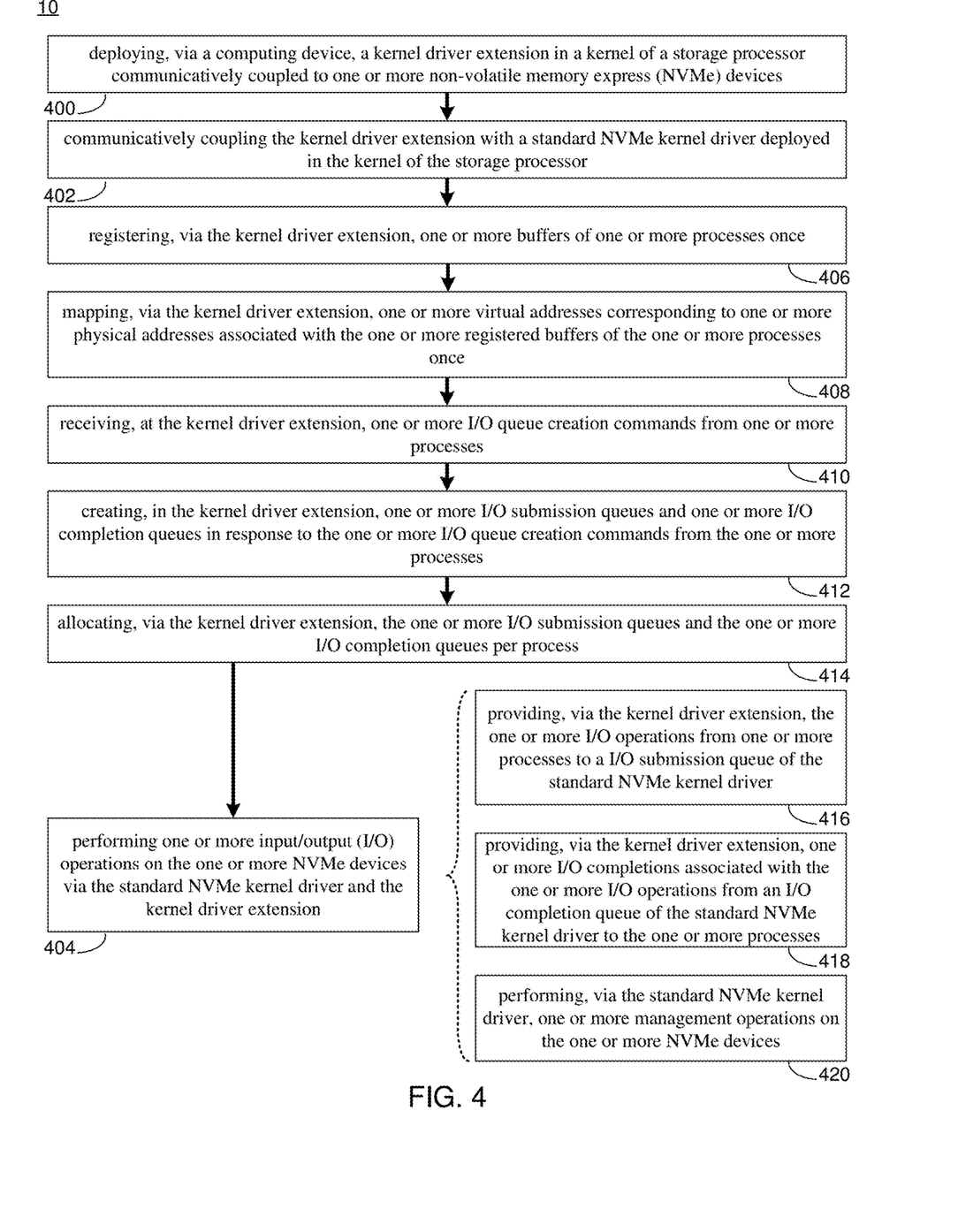
FIG. 4 is an example flowchart of the kernel driver extension process of FIG. 1 according to one or more example implementations of the disclosure.
Figure 5:
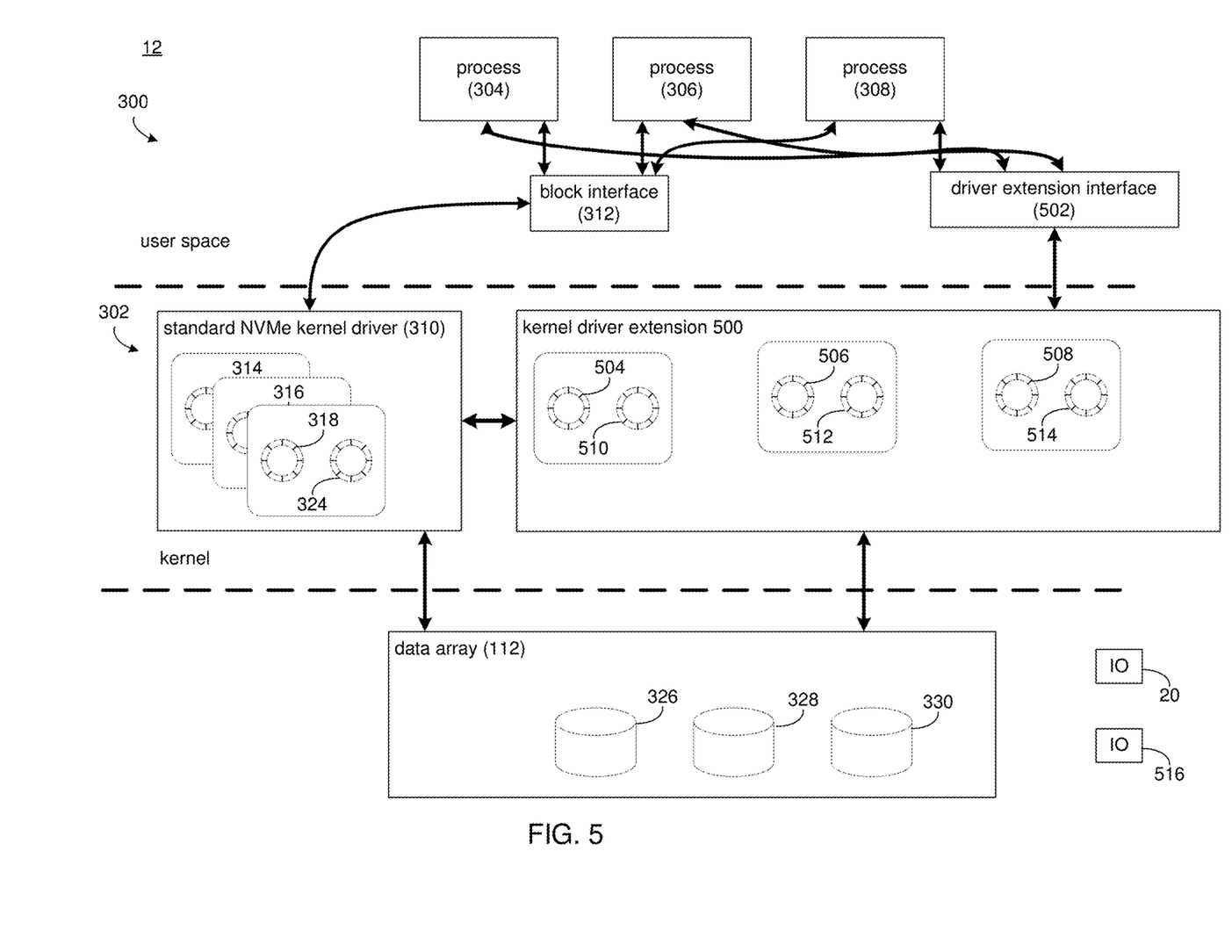
FIGS. 5-7 are example diagrammatic views of the kernel driver extension process of FIG. 1 according to one or more example implementations of the disclosure.
Figure 6:
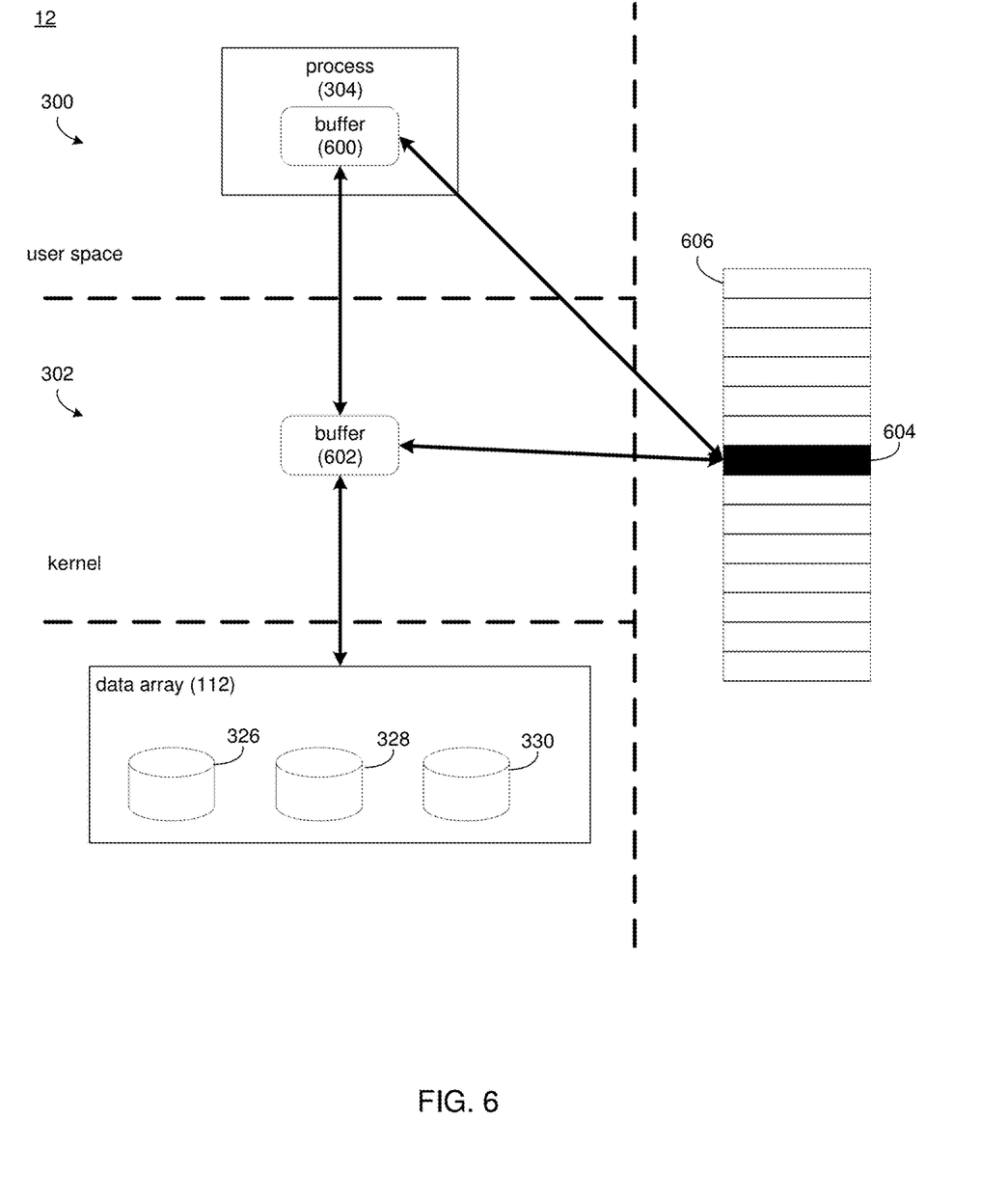

The Kernel Driver Extension Process:

Referring also to FIGS. 4-6 and in some implementations, kernel driver extension process 10 may deploy 400, via a computing device, a kernel driver extension in a kernel of a storage processor communicatively coupled to one or more non-volatile memory express (NVMe) devices. The kernel driver extension may be communicatively coupled 402 with a standard NVMe kernel driver deployed in the kernel of the storage processor. One or more input/output (I/O) operations may be performed 404 on the one or more NVMe devices via the standard NVMe kernel driver and the kernel driver extension.

As will be discussed in greater detail below, embodiments of the present disclosure may provide a kernel driver extension that may co-exist with the standard NVMe kernel driver of the kernel of a storage processor or other computing device. As will be discussed in greater detail below, the kernel driver extension may provide a highly efficient I/O path to the one or more NVMe devices of a data array or disk array by placing I/O requests directly into the one or more I/O submission queues of the standard NVMe kernel driver, reading I/O completions directly from the one or more I/O completion queues of the standard NVMe kernel driver, and/or writing to the one or more doorbell registers of the one or more NVMe devices. Because the deployment of the kernel driver extension is in the kernel, the kernel driver extension may not expose any of the memories of the kernel that involve I/O requests (e.g., the one or more I/O submission queues, the one or more I/O completion queues, etc.) to the user space processes. Additionally, the deployment of the kernel driver extension may not require any modifications to processes of the user space.

In some embodiments, kernel driver extension process 10 may deploy 400, via a computing device, a kernel driver extension in a kernel of a storage processor communicatively coupled to one or more non-volatile memory express (NVMe) devices. For example and referring also to the example of FIG. 5, kernel driver extension process 10 may deploy 400 a kernel driver extension (e.g., kernel driver extension 500) in a kernel (e.g., kernel 302) of a storage processor (e.g., storage processor 100) communicatively coupled to one or more non-volatile memory express devices (e.g., NVMe devices 326, 328, 330 of data array 112). In some embodiments, kernel driver extension 500 may be a kernel driver configured to allow storage processor 100 to communicate with and/or transfer data to and from NVMe devices 326, 328, 330 of data array 112. Deploying 400 kernel driver extension 500 may include executing an installation module provided to storage processor 100 (e.g., via client devices 38, 40, 42, 44 and/or provided from one or more storage targets or NVMe devices (e.g., NVMe devices 326, 328, 330) of data array 112 communicatively coupled to storage processor 100.

In some embodiments, kernel driver extension process 10 may communicatively couple 402 the kernel driver extension with a standard NVMe kernel driver deployed in the kernel of the storage processor. Referring again to the example of FIG. 5 and in some embodiments, kernel driver extension process 10 may communicatively couple 402 kernel driver extension 500 in kernel 302 with standard NVMe kernel driver 310 deployed in kernel 302 (represented by arrow between standard NVMe kernel driver 310 and kernel driver extension 500). In some embodiments, communicatively coupling 402 kernel driver extension 500 with standard NVMe kernel driver 310 may be in response to one or more actions of one or more processes (e.g., processes 304, 306, 308) executed by one or more client devices (e.g., client devices 38, 40, 42, 44) within the user space (e.g., user space 300) of storage processor 100. For example, one or more processes 304, 306, 308 may execute a command (e.g., an "open" command) to access kernel driver extension 500. In response to the command issued to kernel driver extension 500, kernel driver extension 500 may generate a device file for each NVMe drive or device of the one or more NVMe devices 326, 328, 330 of data array 112. In some embodiments, one or more processes 304, 306, 308 may communicate with kernel driver extension 500 via an interface (e.g., interface 502) separate from block interface 312 used for communicating between processes 304, 306, 308 and standard NVMe kernel driver 310.

In some embodiments, kernel driver extension process may register 406, via the kernel driver extension, one or more buffers of one or more processes once. Referring also to the example of FIG. 6 and as known in the art, a buffer may generally include one or portions of physical memory used to store data. In some embodiments, user space 300 may include user space memory buffer 600 and kernel 302 may include kernel memory buffer 602. In some embodiments, pointers of the one or more buffers that are included in NVMe commands may be physical addresses because NVMe devices 326, 328, 330 may use these physical addresses directly for reading and/or writing data to buffers in user space in direct memory access (DMA).

In some embodiments, kernel driver extension process 10 may map 408, via the kernel driver extension, one or more virtual addresses corresponding to one or more physical addresses associated with the one or more registered buffers of the one or more processes once. For example and referring again to the example of FIG. 6, user space may include one or more buffers (e.g., buffer 600) and kernel 302 may include one or more buffers (e.g., buffer 602). In this example, kernel addresses for buffer 602 may be mapped 408 by kernel driver extension process 10 to a same physical address (e.g., physical address 604 of physical memory 606 of storage processor 100) as a virtual address in user space 300 for buffer 600 at initialization of kernel driver extension 500. In this manner, DMA (which can access only physical memory addresses) can fill a buffer that is simultaneously visible to both the kernel and a user space process. Accordingly, copies of data between kernel 302 and user space 300 may be eliminated.

In some embodiments, the one or more buffers (e.g., buffer 600) of the user space may be registered 406 only once so that the virtual to physical mapping 408 of addresses may only happen once. In this manner, the mapping 408 of addresses may occur only during buffer registration 406 and not multiple times and during the performance of I/O requests or other operations as occurs in conventional storage system approaches. For example, this registering 406 of one or more buffers (e.g., buffer 600) and mapping 408 of virtual addresses corresponding to one or more virtual addresses associated with the one or more registered buffers of processes 304, 306, 308 only once may reduce I/O latency and improve the performance of the storage system. In some embodiments and as discussed above, memory buffers used in the NVMe protocol may be registered and pinned down to the computer's or storage processor's physical memory once in a user process lifetime, thus saving CPU processing time needed for managing the memory.

In some embodiments, kernel driver extension process 10 may receive 410, at the kernel driver extension, one or more I/O queue creation commands from one or more processes. For example, kernel driver extension process 10 may provide an I/O queue creation command to create a new I/O submission queue and/or a new I/O completion queue for a particular NVMe device of data array 112 within kernel driver extension 500.

In some embodiments, kernel driver extension process 10 may create 412, in the kernel driver extension, one or more I/O submission queues and one or more I/O completion queues in response to the one or more I/O queue creation commands from the one or more processes. For example and referring again to FIG. 5, kernel driver extension process 10 may receive 410 at kernel driver extension 500 one or more I/O queue creation commands from one or more processes 304, 306, 308. In response to the one or more I/O queue creation commands, kernel driver extension process 10 may create 412 one or more I/O submission queues (e.g., I/O submission queues 504, 506, 508) and/or one or more I/O completion queues (e.g., I/O completion queues 510, 512, 514) in kernel driver extension 500 for performing 404 one or more I/O operations on the one or more NVMe devices of data array 112. In some embodiments, kernel driver extension process 10 may create 412 one or more I/O submission queues and/or one or more I/O completion queues per core of a multi-core processor and/or per NVMe device (e.g., NVMe devices 326, 328, 330). For example, I/O submission queue 504 and I/O completion queue 510 may be created for I/O operations associated with NVMe device 326; I/O submission queue 506 and I/O completion queue 512 may be created for I/O operations associated with NVMe device 328; and I/O submission queue 508 and I/O completion queue 514 may be created for I/O operations associated with NVMe device 330.

Figure 7:
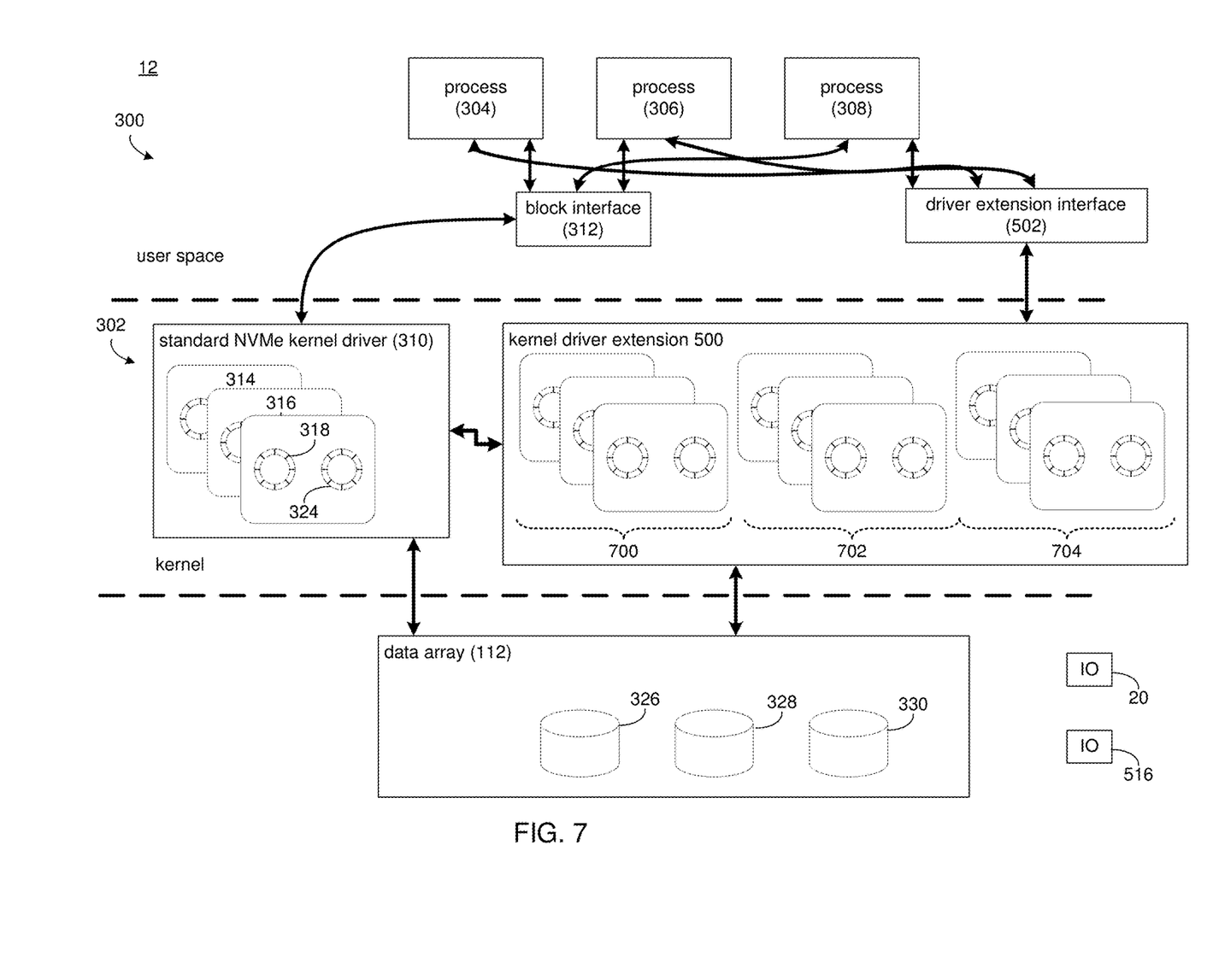

In some embodiments, kernel driver extension process 10 may allocate 414, via the kernel driver extension, the one or more I/O submission queues and the one or more I/O completion queues per process. For example and in some embodiments, kernel driver extension process 10 may allocate 414, via kernel driver extension 500, one or more I/O submission queues and/or one or more I/O completion queues per process (e.g., process 304, 306, 308) so that no dependency may exist between kernel driver extension 500 and multiple processes (e.g., process 304, 306, 308). Referring also to the example of FIG. 7, kernel driver extension process 10 may allocate 414 I/O submission queue and I/O completion queue pairs 700 to process 304; I/O submission queue and I/O completion queue pairs 702 to process 306; and I/O submission queue and I/O completion queue pairs 704 to process 306. In this manner, the performance of storage processor 100 may be improved by allocating 414 the one or more I/O submission queues and the one or more I/O completion queues in the kernel driver extension 500 per process by removing the need for acquiring locks to synchronize data between different processes when handling I/Os of a specific process. While the above example includes three processes and three I/O submission queue and I/O completion queue pairs being allocated (e.g., one pair per NVMe device), it will be appreciated that any number of processes, I/O submission queues, and/or I/O completion queues are possible within the scope of the present disclosure. In this manner, user process-dedicated I/O submission queues and I/O completion queues may remove any need to manage submissions from different user processes to the same submission queue, and the need to dispatch completions from an I/O completion queue to different user processes, thus saving CPU processing time. Accordingly, the allocation of one or more I/O submission queues and/or one or more I/O completion queues per process may improve CPU functionality.

In some embodiments, kernel driver extension process 10 may perform 404 one or more input/output (I/O) operations on the one or more NVMe devices via the standard NVMe kernel driver and the kernel driver extension. In some embodiments and as discussed above, I/O operations may include I/O requests, I/O completions corresponding to the I/O requests, etc. As will be discussed in greater detail below, kernel driver extension process 10 may perform a first set of I/O operations on the one or more NVMe devices via the kernel driver extension and a second set of I/O operations on the one or more NVMe devices via the standard NVMe kernel driver. As discussed above, the performance of certain I/O operations on each of the standard NVMe kernel driver and the kernel driver extension may allow one or more processes to more efficiently perform I/O operations on the one or more NVMe devices without modifying the one or more processes and/or without exposing the I/O queues of the standard NVMe kernel driver to the processes of the user space. In this manner, user processes may be unaware of the kernel driver extension, and can work exactly as if kernel driver extension did not exist. Accordingly, kernel driver extension process 10 may allow integration of the kernel driver extension with existing work flows.

In some embodiments, performing 404 the one or more I/O operations on the storage array via the standard NVMe kernel driver and the kernel driver extension may include providing 416, via the kernel driver extension, the one or more I/O operations from one or more processes to a I/O submission queue of the standard NVMe kernel driver. Referring again to the example of FIG. 5 and in some embodiments, kernel driver extension process 10 may provide an I/O operation (e.g., write data to NVMe device 330) to storage processor 100. Kernel driver extension process 10 may provide I/O operation (e.g., I/O request 20) to kernel driver extension 500 based upon, at least in part, the type of I/O operation (e.g., reads, writes, non-administrative operations, etc.). In this example, kernel driver extension 500 may store I/O operation 20 in an I/O submission queue (e.g., I/O submission queue 508). In some embodiments, kernel driver extension may directly provide I/O operation 20 from I/O submission queue 508 to I/O submission queue 318 of standard NVMe kernel driver 310. In this manner, kernel driver extension process 10 may increase the efficiency by which I/O operations are provided to the standard NVMe kernel driver and performed on the one or more NVMe devices. While a write operation has been discussed above as an example of an I/O operation, it will be appreciated that other I/O operations are possible within the scope of the present disclosure.

In some embodiments, performing 404 the one or more I/O operations on the storage array via the standard NVMe kernel driver and the kernel driver extension may include providing 418, via the kernel driver extension, one or more I/O completions associated with the one or more I/O operations from an I/O completion queue of the standard NVMe kernel driver to the one or more processes. Referring again to the example of FIG. 5 and in some embodiments, process 308 may provide an I/O operation (e.g., poll previously submitted I/O request to determine if I/O operation was executed) to storage processor 100. In this example, kernel driver extension 500 may directly request an I/O completion (e.g., I/O completion 516) from I/O completion queue 324 of standard NVMe kernel driver 310. In some embodiments, kernel driver extension 500 may store I/O completion 516 in an I/O completion queue (e.g., I/O completion queue 514) and provide I/O completion 516 to process 308. In this manner, kernel driver extension process 10 may increase the efficiency by which I/O completions are provided to the one or more process of the user space. In some embodiments, kernel driver extension process 10 may altogether skip asynchronous processing of I/O completions as in the case of the standard NVMe kernel driver because, at least in part, the user process which handles the completions may decide for itself when it is ready to handle or request the I/O completions. Accordingly, kernel driver extension process 10 may save CPU processing time.

In some embodiments, kernel driver extension process 10 may perform 420, via the standard NVMe kernel driver, one or more management operations on the one or more NVMe devices. For example, kernel driver extension process 10 may use standard NVMe kernel driver 310 for management operations including, but not limited to, creating and destroying I/O queues in the standard NVMe kernel driver, providing notifications of drive hot-plug and surprise-removal, etc. In this manner, kernel driver extension process 10 may perform 420 I/O operations that are non-performance critical (e.g., management operations) using standard NVMe kernel driver 310 and perform 404 I/O operations that more performance critical using kernel driver extension 500. In some embodiments, the one or more management operations or device management operations may not normally occur during I/O operations. In some embodiments, kernel driver extension 500 may delegate device management operations to standard NVMe kernel driver 310. In this manner, kernel driver extension 500 may receive notifications from standard NVMe kernel driver 310 only when it is necessary to alter the behavior of I/O operations, e.g. when the device queues are unavailable because the device have been reset, disconnected, etc. Accordingly, because standard NVMe kernel driver 310 is used to perform the one or more management operations, standard NVMe kernel driver 310 may be the point of entry for management operations of the administrative queue. For example and as discussed above, administrative I/O submission queue 332 may be configured to provide one or more management operations (e.g., create and/or destroy I/O submission queues, create and/or destroy I/O completion queues, etc.) and administrative I/O completion queue 334 may be configured to receive completions for a corresponding I/O request of administrative I/O submission queue 332.

In some embodiments, the one or more I/O queues of the standard NVMe kernel driver may be isolated from one or more processes via the kernel driver extension. As discussed above and in some embodiments, by deploying 400 kernel driver extension 500 in kernel 302, kernel driver extension 500 may not expose any of the memories that involve I/O flow (e.g., I/O submission queues, I/O completion queues, doorbell registers, etc.) to user space processes 304, 306, 308. In this manner, errors or bugs in user space processes 304, 306, 308 may be prevented from overwriting the memories that involve I/O flow which might otherwise lead to data corruption and/or inconsistency in storage system 12. Accordingly, safety of the interface between the kernel and the user space processes may remain uncompromised, as the kernel can easily and rapidly identify the user process which submits I/O operations, the user process that polls for I/O completions, and/or load verify the validity of the process requests.

As discussed above, embodiments of the present disclosure may improve the performance of a storage processor in performing I/O operations on a data array. In one example involving a 4 KB random read load with a single CPU core, it was observed that the kernel driver extension was able to provide 6.8 million Input/output operations per second (IOPS) with a single CPU core utilized to about 60% while the standard NVMe kernel driver was able to provide 300,000 IOPS with 100% utilization of the single CPU core.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method comprising:
   deploying, via a computing device, a kernel driver extension in a kernel of a storage processor communicatively coupled to one or more non-volatile memory express (NVMe) devices, wherein the kernel driver extension is configured to communicate with one or more processes via a driver extension interface;
   communicatively and directly coupling the kernel driver extension with a standard NVMe kernel driver deployed in the kernel of the storage processor, wherein the standard NVME kernel driver is configured to communicate with the one or more processes via a block interface that is separate from the driver extension interface; and
   performing one or more input/output (I/O) operations on the one or more NVMe devices via the standard NVMe kernel driver and the kernel driver extension, wherein performing one or more I/O operations on the storage array via the standard NVMe kernel driver and the kernel driver extension includes one or more of:
   providing, via the kernel driver extension, the one or more I/O operations from the one or more processes to a I/O submission queue of the standard NVMe kernel driver; and
   providing, via the kernel driver extension, one or more I/O completions corresponding to the one or more I/O operations from an I/O completion queue of the standard NVMe kernel driver to the one or more processes.

2. The computer-implemented method of claim 1, further comprising:
   registering, via the kernel driver extension, one or more buffers of the one or more processes once; and
   mapping, via the kernel driver extension, one or more virtual addresses corresponding to one or more physical addresses associated with the one or more registered buffers of the one or more processes once.

3. The computer-implemented method of claim 1, further comprising:
   receiving, at the kernel driver extension, one or more I/O queue creation commands from the one or more processes; and
   creating, in the kernel driver extension, one or more I/O submission queues and one or more I/O completion queues in response to the one or more I/O queue creation commands from the one or more processes.

4. The computer-implemented method of claim 3, further comprising:
   allocating, via the kernel driver extension, the one or more I/O submission queues and the one or more I/O completion queues per process of the one or more processes.

5. The computer-implemented method of claim 1, wherein performing one or more I/O operations on the storage array via the standard NVMe kernel driver and the kernel driver extension includes:
   performing, via the standard NVMe kernel driver, one or more management operations on the one or more NVMe devices.

6. The computer-implemented method of claim 1, wherein the one or more I/O queues of the kernel are isolated from the one or more processes via the kernel driver extension.

7. A computer program product residing on a non-transitory computer readable medium having a plurality of instructions stored thereon which, when executed by a processor, cause the processor to perform operations comprising:
   deploying a kernel driver extension in a kernel of a storage processor communicatively coupled to one or more non-volatile memory express (NVMe) devices, wherein the kernel driver extension is configured to communicate with one or more processes via a driver extension interface;
   communicatively and directly coupling the kernel driver extension with a standard NVMe kernel driver deployed in the kernel of the storage processor, wherein the standard NVME kernel driver is configured to communicate with the one or more processes via a block interface that is separate from the driver extension interface; and
   performing one or more input/output (I/O) operations on the one or more NVMe devices via the standard NVMe kernel driver and the kernel driver extension, wherein performing one or more I/O operations on the storage array via the standard NVMe kernel driver and the kernel driver extension includes one or more of:
  providing, via the kernel driver extension, the one or more I/O operations from the one or more processes to a I/O submission queue of the standard NVMe kernel driver; and
  providing, via the kernel driver extension, one or more I/O completions corresponding to the one or more I/O operations from an I/O completion queue of the standard NVMe kernel driver to the one or more processes.

8. The computer program product of claim 7, wherein the operations further comprise:
  registering, via the kernel driver extension, one or more buffers of the one or more processes once; and
  mapping, via the kernel driver extension, one or more virtual addresses corresponding to one or more physical addresses associated with the one or more registered buffers of the one or more processes once.

9. The computer program product of claim 7, wherein the operations further comprise:
  receiving, at the kernel driver extension, one or more I/O queue creation commands from the one or more processes; and
  creating, in the kernel driver extension, one or more I/O submission queues and one or more I/O completion queues in response to the one or more I/O queue creation commands from the one or more processes.

10. The computer program product of claim 9, wherein the operations further comprise:
  allocating, via the kernel driver extension, the one or more I/O submission queues and the one or more I/O completion queues per process of the one or more processes.

11. The computer program product of claim 7, wherein performing one or more I/O operations on the storage array via the standard NVMe kernel driver and the kernel driver extension includes:
  performing, via the standard NVMe kernel driver, one or more management operations on the one or more NVMe devices.

12. The computer program product of claim 7, wherein the one or more I/O queues of the kernel are isolated from the one or more processes via the kernel driver extension.

13. A computing system including a processor and memory configured to perform operations comprising:
  deploying a kernel driver extension in a kernel of a storage processor communicatively coupled to one or more non-volatile memory express (NVMe) devices, wherein the kernel driver extension is configured to communicate with one or more processes via a driver extension interface;
  communicatively and directly coupling the kernel driver extension with a standard NVMe kernel driver deployed in the kernel of the storage processor, wherein the standard NVME kernel driver is configured to communicate with the one or more processes via a block interface that is separate from the driver extension interface; and
  performing one or more input/output (I/O) operations on the storage array via the standard NVMe kernel driver and the kernel driver extension, wherein performing one or more I/O operations on the storage array via the standard NVMe kernel driver and the kernel driver extension includes one or more of:
    providing, via the kernel driver extension, the one or more I/O operations from the one or more processes to a I/O submission queue of the standard NVMe kernel driver; and
    providing, via the kernel driver extension, one or more I/O completions corresponding to the one or more I/O operations from an I/O completion queue of the standard NVMe kernel driver to the one or more processes.

14. The computing system of claim 13, wherein the processor is further configured to perform operations comprising:
  registering, via the kernel driver extension, one or more buffers of the one or more processes once; and
  mapping, via the kernel driver extension, one or more virtual addresses corresponding to one or more physical addresses associated with the one or more registered buffers of the one or more processes once.

15. The computing system of claim 13, wherein the processor is further configured to perform operations comprising:
  receiving, at the kernel driver extension, one or more I/O queue creation commands from the one or more processes; and
  creating, in the kernel driver extension, one or more I/O submission queues and one or more I/O completion queues in response to the one or more I/O queue creation commands from the one or more processes.

16. The computing system of claim 15, wherein the processor is further configured to perform operations comprising:
  allocating, via the kernel driver extension, the one or more I/O submission queues and the one or more I/O completion queues per process of the one or more processes.

17. The computing system of claim 13, wherein performing one or more I/O operations on the storage array via the standard NVMe kernel driver and the kernel driver extension includes:
  performing, via the standard NVMe kernel driver, one or more management operations on the one or more NVMe devices.

* * * * *